Patented July 26, 1927.

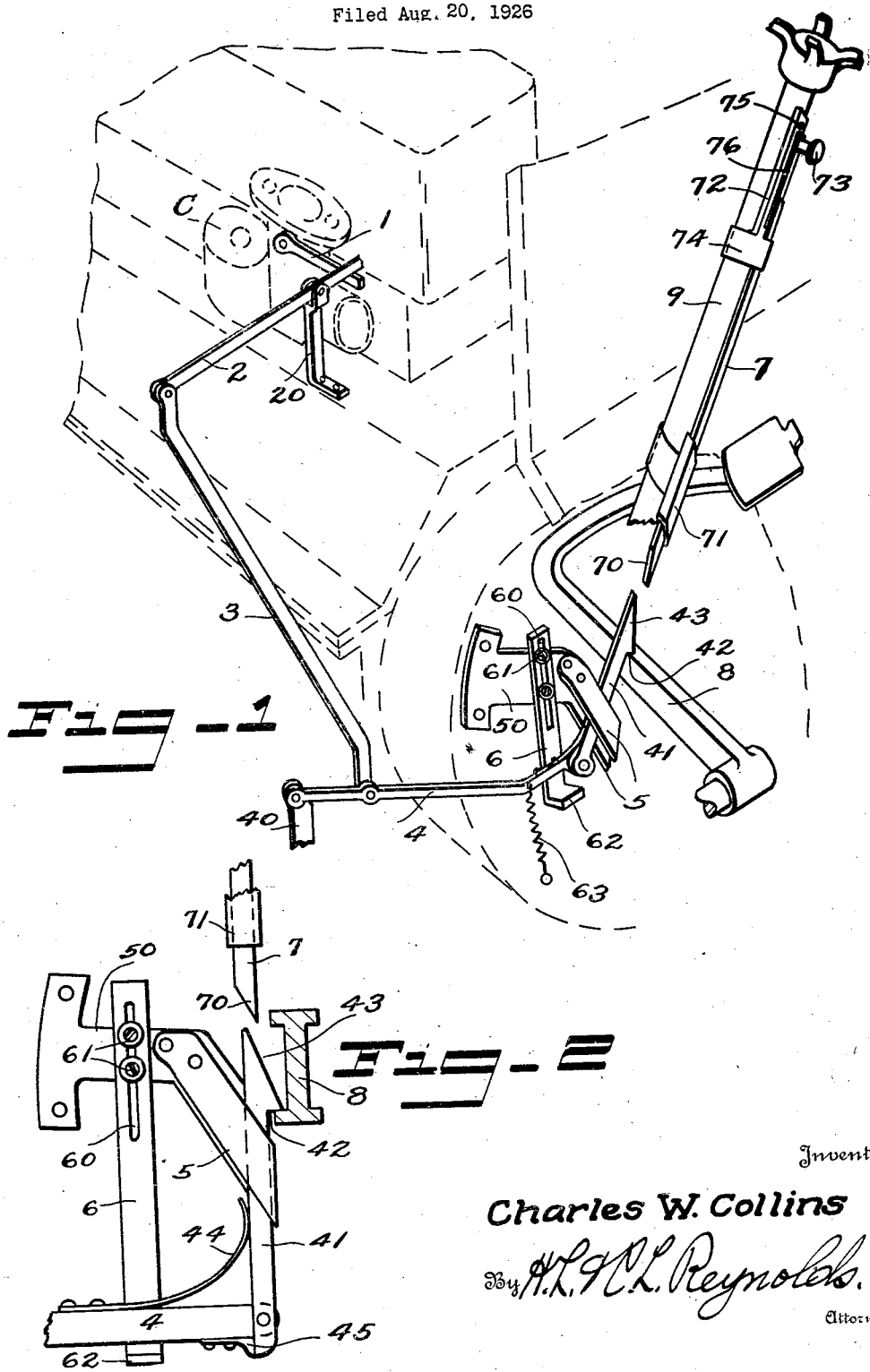

1,636,851

UNITED STATES PATENT OFFICE.

CHARLES W. COLLINS, OF SEATTLE, WASHINGTON.

AUTOMATIC CARBURETOR-FEED CONTROL.

Application filed August 20, 1926. Serial No. 130,420.

My invention relates to devices whereby the gasoline feed control upon automobiles may be automatically operated by the releasing movement of the brake to insure ample feed of gasoline when releasing the brake at starting of the car.

The object of my invention is to make it possible to so connect the brake operating means with the gasoline feed control that the direct actuation of the accelerator as a separate and distinct operation when starting, may be avoided, at least until after the first starting impulse is over.

My invention consists of certain means employed in securing this result, of which those illustrated in the accompanying drawings and hereinafter described are given as an approved apparatus for carrying out my invention.

Figure 1 shows in perspective the apparatus employed, the related parts of the engine being shown in broken lines.

Figure 2 shows in detail the parts employed for actuation from the brake lever.

There are many occasions in starting an automobile, when the prompt operation of the accelerator the instant of releasing the brake is highly important. One such occasion is with the car heading up a material grade. Such prompt action of the accelerator on starting is desirable in most cases and imperative in some. It is my purpose to secure this result by the use of apparatus which will, whenever desired, so tie together the brake and the carburetor feed supply, that the release of the brake will automatically operate the gasoline control to supply an ample amount of gasoline. The apparatus illustrated comprises the following parts:

At C, in Figure 1, is an outline illustration of a carburetor, which may be of any suitable type. The lever 1 represents any member whereby the rate of feed of the carburetor may be controlled. As illustrated, it is contemplated that downward movement of this lever will augment the rate of feed.

Pivoted upon a support 20, which is in turn supported from any convenient part of the engine or car, is a lever 2, having one end positioned to engage the carburetor control lever 1 to depress the latter. A lever 4 is pivoted upon a fixed support 40 with its other end adjacent to the brake lever or arm 8 and so as to swing in the same direction as the adjacent part of the brake lever. This is connected with lever 2 by a link 3, or by any other suitable means whereby simultaneous movement is secured.

The end of lever 4, which is adjacent to the brake lever 8, is provided with means whereby it may momentarily be actuated by the release movement of the brake lever. Such means as illustrated consist of a dog or pawl 41, having a tooth 42, adapted to be engaged by the brake lever to thereby swing lever 41. A spring 44 holds the pawl in lever-engaging position whenever it is not purposely thrown out of engaging position. A stop, as 45, limits its outward throw. Guide fingers 5, carried by a bracket 50 hold the pawl against lateral movement. A stop consisting of a lateral projection 62 carried by a bar 6 controls the swing of the lever 4. Bar 6 may be adjustable, as by use of a slot 60 and clamping screws or bolts 61. A spring 63 holds lever 4 down.

The position of the brake lever 8 shown is that occupied when the brakes are applied. In this position the tooth of pawl 41 will extend over a face of the brake lever, so that when it is returned to normal position it will raise the pawl and the connected lever 4, thereby depressing the carburetor control or throttle lever 1 to supply additional gasoline.

Positioned at a point to engage the inclined face 43 of the pawl to thereby disengage it from lever 8, is a cam member 7 having an inclined or cam face 70 which engages the face 43 of the pawl. This is positioned to act before the brake lever reaches the end of its return stroke.

The disengaging cam should be movable to a position where it may permanently prevent the pawl 41 from engaging the brake lever. It would normally remain in this position as it would not be desired to operate as described except occasionally. I have therefore made the disengaging member 7 as a rod which extends upwards alongside of the steering post 9 and is provided with an operating handle 73. Guides 71 and 74 are carried on the steering post. The guide 74 carries a bar 72 in which are a series of holes, of which one is shown at 75, which holes receive a securing pin carried by a spring bar 76, which forms an extension of the bar 7. Said securing pin may be an extension of the hand knob or operating handle 73. By pulling out this knob the pin is removed from the hole 75 and adjustment may be readily made. By this means rod 7 is held in adjusted position. Moving rod 7 down releases the pawl 42 sooner and if pushed far enough down will prevent operation of the device. Adjustment is made to the point, which experience indicates fits the condition of starting.

The advantage of this device is most apparent when a car is to be started against unfavorable conditions, such, for instance, as when starting against a heavy grade, or other conditions which require a heavy pull. By its use the supply of a liberal amount of gasoline at the instant of releasing the brake is insured.

While I have referred to the lever 8 as being the brake lever, it is obvious that the lever used may be the clutch lever and the adjustment be made to act when the clutch is applied.

What I claim as my invention is:

1. In an automobile, the combination with a gasoline supply controlling member and a brake lever, of means connecting said controlling member and the brake lever to automatically supply gasoline to the engine by the brake releasing movement of said lever.

2. In an automobile, the combination with gasoline supply controlling means, an operating lever for said means having one end adjacent a brake lever and a pawl carried by said lever and adapted to be engaged by the brake lever to operate said gasoline controlling means to supply gasoline by the releasing movement of the brake lever.

3. In an automobile, in combination, a brake lever, a carburetor feed control member, a lever positioned to actuate said control member, a lever positioned to be actuated by the releasing movement of the brake lever and means for actuatively connecting said two levers.

4. In an automobile, the combination with a gasoline supply controlling member and a brake lever, of means connecting said controlling member and the brake lever to automatically supply gasoline to the engine by the brake releasing movement of said lever, and means for at will preventing actuation of said controlling means from the brake lever.

5. In an automobile, the combination with gasoline supply controlling means, an operating lever for said means having one end adjacent a brake lever and a pawl carried by said lever and adapted to be engaged by the brake lever to operate said gasoline controlling means to supply gasoline by the releasing movement of the brake lever, and a member movable into position to engage said pawl to thereby prevent engagement thereof by the brake lever.

6. In an automobile, the combination with gasoline supply controlling means, an operating lever for said means having one end adjacent a brake lever and a pawl carried by said lever and adapted to be engaged by the brake lever to operate said gasoline controlling means to supply gasoline by the releasing movement of the brake lever, a cam movable to engage said pawl to thereby prevent its engagement by the brake lever and an extension from said cam to the driver's position and means to move and hold said cam and extension into operative and inoperative positions.

Signed at Seattle, Washington, this 13th day of August, 1926.

CHARLES W. COLLINS.